United States Patent
Lu et al.

(10) Patent No.: US 11,111,605 B2
(45) Date of Patent: Sep. 7, 2021

(54) IODINE DOPED BISMUTHYL CARBONATE NANOSHEET AND MOLYBDENUM DISULFIDE MODIFIED CARBON NANOFIBER COMPOSITES, PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY

( * ) Notice: Subject to any disclaimer, the term of this patent is extended or adjusted under 35 U.S.C. 154(b) by 408 days.

(21) Appl. No.: 16/171,317

(22) Filed: Oct. 25, 2018

(65) Prior Publication Data
US 2019/0127883 A1    May 2, 2019

(30) Foreign Application Priority Data
Oct. 26, 2017 (CN) .......................... 201711023309.2

(51) Int. Cl.
*C01B 32/15* (2017.01)
*D01D 5/00* (2006.01)
(Continued)

(52) U.S. Cl.
CPC ............. *D01D 5/003* (2013.01); *C01B 32/15* (2017.08); *C01B 32/156* (2017.08); *C01B 32/174* (2017.08); *C01B 32/184* (2017.08); *D01D 10/02* (2013.01); *D01F 1/10* (2013.01); *D01F 9/22* (2013.01); *D01F 11/121* (2013.01);
(Continued)

(58) Field of Classification Search
CPC ...... D01D 5/003; D01D 10/02; D01D 5/0007; D01D 10/06; C01B 32/60; C01B 32/156; C01B 32/174; C01B 32/184; C01B 32/15; D04H 1/728; D01F 9/22; D01F 1/10;
(Continued)

(56) References Cited

PUBLICATIONS

Hu, Jundie, et al. "Recyclable carbon nanofibers@ hierarchical I-doped Bi2O2CO3—MoS2 membranes for highly efficient water remediation under visible-light irradiation." ACS Sustainable Chemistry & Engineering 6.2 (2018): 2676-2683.*

* cited by examiner

*Primary Examiner* — Richard M Rump
(74) *Attorney, Agent, or Firm* — SZDC Law PC

(57) ABSTRACT

Iodine doped bismuthyl carbonate nanosheet and molybdenum disulfide modified carbon nanofiber composites, preparation method and its application in wastewater treatment are disclosed. Bismuth citrate and sodium carbonate as precursors, sodium carbonate as a precipitating agent, dispersed in a mixed solution of water and ethylene glycol, sodium iodide as a iodine source, nano carbon fiber membrane act as the carrier, to synthesis carbon fiber membrane that modified by iodine-doped $Bi_2O_2CO_3$ nanosheets; then sodium molybdate and thioacetamide as precursors, dispersed in water to react to obtain iodine doped bismuthyl carbonate nanosheet and molybdenum disulfide modified carbon nanofiber composites. The composite material synthesized through a series of steps exhibit excellent photocatalytic activity for the degradation of Rhodamine B and can be recycled for many times. And this invention has the advantages of simple preparation process, easy recovery and multiple use, etc., and has industrial application prospect in water pollution treatment.

8 Claims, 4 Drawing Sheets

(51) Int. Cl.
*D01D 10/02* (2006.01)
*D01F 1/10* (2006.01)
*D01F 11/12* (2006.01)
*D01F 9/22* (2006.01)
*D04H 1/728* (2012.01)
*C01B 32/184* (2017.01)
*C01B 32/156* (2017.01)
*C01B 32/174* (2017.01)
D01D 10/06 (2006.01)
C02F 1/30 (2006.01)
D06M 11/83 (2006.01)
D06M 11/76 (2006.01)

(52) U.S. Cl.
CPC ........... *D01F 11/127* (2013.01); *D04H 1/728* (2013.01); *C01P 2002/50* (2013.01); *C01P 2004/03* (2013.01); *C02F 1/30* (2013.01); *C02F 2305/10* (2013.01); *D01D 5/0007* (2013.01); *D01D 10/06* (2013.01); *D06M 11/76* (2013.01); *D06M 11/83* (2013.01)

(58) Field of Classification Search
CPC ..... D01F 11/121; D01F 11/127; D06M 11/83; D06M 11/76; B01J 35/004; B01J 35/065
See application file for complete search history.

IODINE DOPED BISMUTHYL CARBONATE NANOSHEET AND MOLYBDENUM DISULFIDE MODIFIED CARBON NANOFIBER COMPOSITES, PREPARATION METHOD AND APPLICATION THEREOF

This application claims priority to Chinese Patent Application No.: 201711023309.2, filed on Oct. 26, 2017, which is incorporated by reference for all purposes as if fully set forth herein.

FIELD OF THE INVENTION

The present invention relates to the field of nanocomposite materials, and more particularly to iodine doped bismuthyl carbonate nanosheet and molybdenum disulfide modified carbon nanofiber composites, preparation method and application thereof.

TECHNICAL BACKGROUND

The treatment of water contamination remains a critical issue worldwide. Wastewater is mostly produced from the emission of organic pollutants (such as phenol, acid red, methylene blue, or RhB from printing, textiles, food, and factories) and seriously affects the environment and humanity. Therefore, the degradation of organic pollutants is imperative. Many traditional techniques and methods have been developed for the degradation of organic pollutants from wastewater such as adsorption, chemical oxidation and biodegradation. However, several disadvantages such as incompletely, secondary pollution etc. limit the industrial application of these methods. In the last few years, a photocatalytic strategy for the degradation of dye wastewater has attracted considerable attention. Bi-based semiconductors, such as $Bi_2WO_6$, $BiVO_4$, and BiOX (X=Cl, Br, I), have been widely investigated. However, pure photocatalyst nanoparticles still cannot fully meet the requirements for practical application because of the rapid recombination of photogenerated electron—hole pairs, so that it is difficult to achieve catalytic degradation effect. The improvement of photocatalyst, such as construction of heterojunctions, surface modification of semiconductor photocatalysts and element doping, can enhance their photocatalytic activity.

SUMMARY OF THE INVENTION

The object of the present invention is to provide iodine doped bismuthyl carbonate nanosheet and molybdenum disulfide modified carbon nanofiber composites and its preparation method.

The iodine-doped $Bi_2O_2CO_3$ nanosheets are modified on the surface of nanocarbon fiber membrane through chemical reaction, and further reaction let $MoS_2$ nanoflakes also be modified on its surface, to obtain iodine doped bismuthyl carbonate nanosheet and molybdenum disulfide modified carbon nanofiber composites, so as to achieve wide application of the material in photocatalytic degradation of Rhodamine B.

In order to achieve the above object, the specific technical solutions of the present invention are as follows:

A preparation method of iodine doped bismuthyl carbonate nanosheet and molybdenum disulfide modified carbon nanofiber composites, characterized in comprising the following steps:

(1) dispersing nano carbon fiber membrane, bismuth citrate, sodium iodide and sodium carbonate in a mixed solution of water and ethylene glycol to obtain a kind of nano carbon fiber material modified by iodine doped bismuthyl carbonate;

(2) dispersing sodium molybdate and thioacetamide in water, then adding said nano carbon fiber material modified by iodine doped bismuthyl carbonate, reacting to obtain iodine doped bismuthyl carbonate nanosheet and molybdenum disulfide modified carbon nanofiber composites.

The invention also discloses a nano carbon fiber material modified by iodine doped bismuthyl carbonate and its preparation method, comprising, dispersing nano carbon fiber membrane, bismuth citrate, sodium iodide and sodium carbonate in a mixed solution of water and ethylene glycol to obtain a kind of nano carbon fiber material modified by iodine doped bismuthyl carbonate.

In the above technical scheme, in step (1), using the N,N-dimethylformamide solution of polyacrylonitrile (5% to 20%) as raw material, polyacrylonitrile fiber membrane is obtained through electrospinning method, then calcined to obtain a nanocarbon fiber membrane, the diameter of said nanocarbon fiber is 0.5 μm.

In the above technical scheme, in the step (1), said polyacrylonitrile fiber membrane is calcinated at 400 to 600° C. under argon atmosphere, the heating rate is 2 to 15° C. per minute and the calcination time is 3-6 hours, at last, a kind of black nanocarbon fiber membranes with the diameter of 0.5 μm is obtained. It is easy to obtain the carbon fiber having a smooth surface and a uniform thickness under this condition, and this carbon fiber of 0.5 μm is most conducive to the growth of iodine-doped $Bi_2O_2CO_3$ nanosheets and $MoS_2$ nanoflakes.

In the above technical scheme, in the step (1), the mass ratio of bismuth citrate, sodium carbonate, sodium iodide and the nanocarbon fiber membrane is (132 to 134):(38 to 40):100:(8 to 10); bismuth citrate, sodium carbonate and sodium iodide are dispersed in a mixed solution of water and ethylene glycol, sonicated for 15 minutes to disperse evenly, then stirred for 2 to 4 hours at room temperature, then the precursor is transferred into a reaction vessel, said nano carbon fiber membrane is added in, and heated at 150 to 180° C. for 24 to 36 hours. The reaction is simple, safe and efficient.

In the above technical scheme, in the step (1), after the reaction is completed, the mixture is naturally cooled to room temperature, the product is removed from the reaction vessel with tweezers, washed with water and ethanol 2 times respectively, and transferred to a vacuum oven for drying for 6 hours.

In the above technical scheme, in the step (2), sodium molybdate and thioacetamide with the mass ratio of 1.2:1 are dispersed in water to form a precursor, ultrasound half an hour to make it disperse evenly; the precursor is transferred into a reaction vessel and heated at 180 to 250° C. for 6 to 8 hours. $MoS_2$ nanoflakes can be modified easily with a simple secondary hydrothermal reaction.

In the above technical scheme, in the step (2), after the hydrothermal reaction is completed, the mixture is naturally cooled to room temperature, the product is removed from the reaction vessel with tweezers, washed with water and ethanol 2 times respectively, and transferred to a vacuum oven for drying for 6 hours.

In this invention, carbon nanofiber membrane with a diameter of 0.5 μm is act as a carrier, bismuth citrate and sodium carbonate as precursors, sodium carbonate as a precipitating agent, sodium iodide as a iodine source, mixed solution of water and ethylene glycol as the solvent, to synthesis carbon fiber membrane that modified by iodine-doped $Bi_2O_2CO_3$ nanosheets; then iodine-doped $Bi_2O_2CO_3$ nanosheets modified carbon fiber membrane act as the carrier, sodium molybdate and thioacetamide as precursors, dispersed in water to modify the $MoS_2$ nanoflakes on the surface of the nanocarbon fiber which coated by iodine-doped $Bi_2O_2CO_3$ nanosheets. The addition of $MoS_2$ could enhance the light absorption of this photocatalytic material, and with a suitable band gap and good conductivity, and then could improve the photocatalytic properties greatly. The invention discloses a preparation method of iodine-doped $Bi_2O_2CO_3$ nanosheets and $MoS_2$ nanoflakes modified nanocarbon fiber membrane and its application in the photocatalytic degradation of dye Rhodamine B; this invention also discloses the application of this photocatalytic material in wastewater treatment.

Advantages of this Invention (1). The preparation method of the carbon nanofiber membrane composite material that iodine-doped $Bi_2O_2CO_3$ nanosheets and $MoS_2$ nanoflakes modified nanocarbon fiber membrane disclosed by the invention is simple, the raw materials are low in cost and easy to operate, there is no expensive equipment is used in the whole process, which is critical for industrial applications (2). The composite material disclosed in this present invention, $Bi_2O_2CO_3$ exhibit a remarkable effect on the dye Rhodamine B in wastewater, but $Bi_2O_2CO_3$ has a wide band gap, and the absorption of visible light is weak, the absorption of visible light could be improved significantly through the doping of the element, thereby enhancing the degradation efficiency; and then the modification of better conductive material such as $MoS_2$ could prevent the recombination of photogenerated electron-hole pairs.

(3). The invention disclosed the composite material that iodine-doped $Bi_2O_2CO_3$ nanosheets and $MoS_2$ nanoflakes modified nanocarbon fiber membrane with high surface area, high light absorption efficiency, good catalysis effect, stable performance, convenient and repeatable for many times, with high efficiency photocatalytic effect for the degradation of dye Rhodamine B, can be used for the treatment of a variety of environmental sewage dye.

DETAILED DESCRIPTION OF THE INVENTION

Example 1

Figure 1:
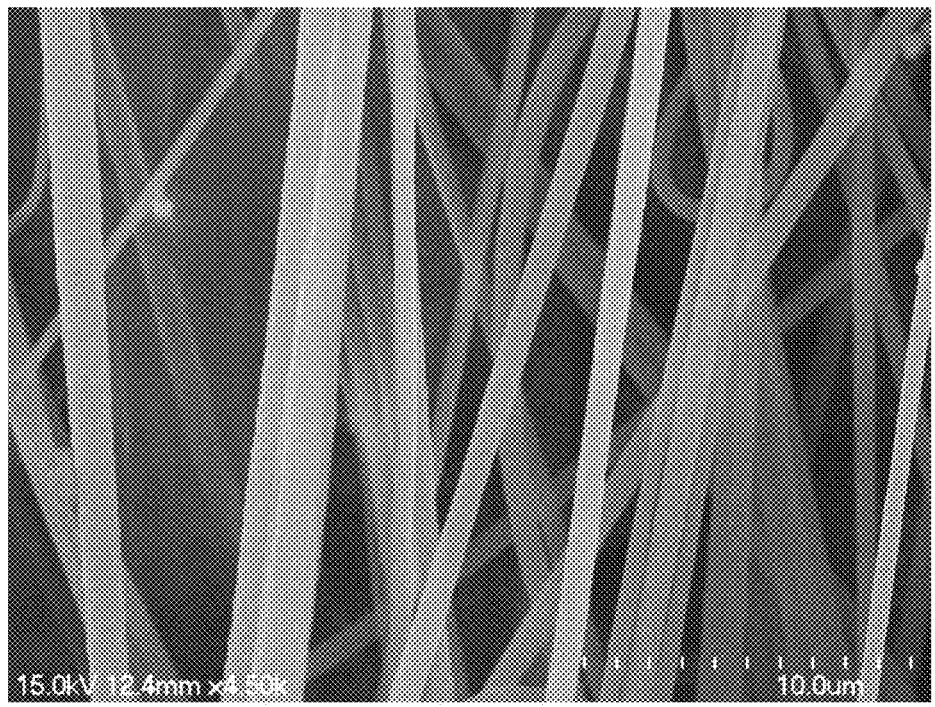
FIG. 1 is the SEM image of carbon nanofibers.

Preparation of carbon nanofiber membrane. Specific steps are as follows:

1 g of polyacrylonitrile and 9 g of N, N-dimethylformamide are placed in a 20 ml glass bottle and stirred at room temperature for 5 hours until the polyacrylonitrile is completely dissolved and mixed well. Then the solution is added to the syringe and spun by electrospinning method, get a white polyacrylonitrile fiber membrane. The polyacrylonitrile fiber membrane is calcined for 5 hours at 500° C. with a heating rate of 10° C. per minute under argon protection, finally obtained a carbon nanofiber membrane having a diameter of 0.5 μm; FIG. 1 is the SEM image of carbon nanofibers, it can be seen that the nanofibers with diameter of 0.5 μm distributed evenly and the surface of them are smooth.

Figure 2:
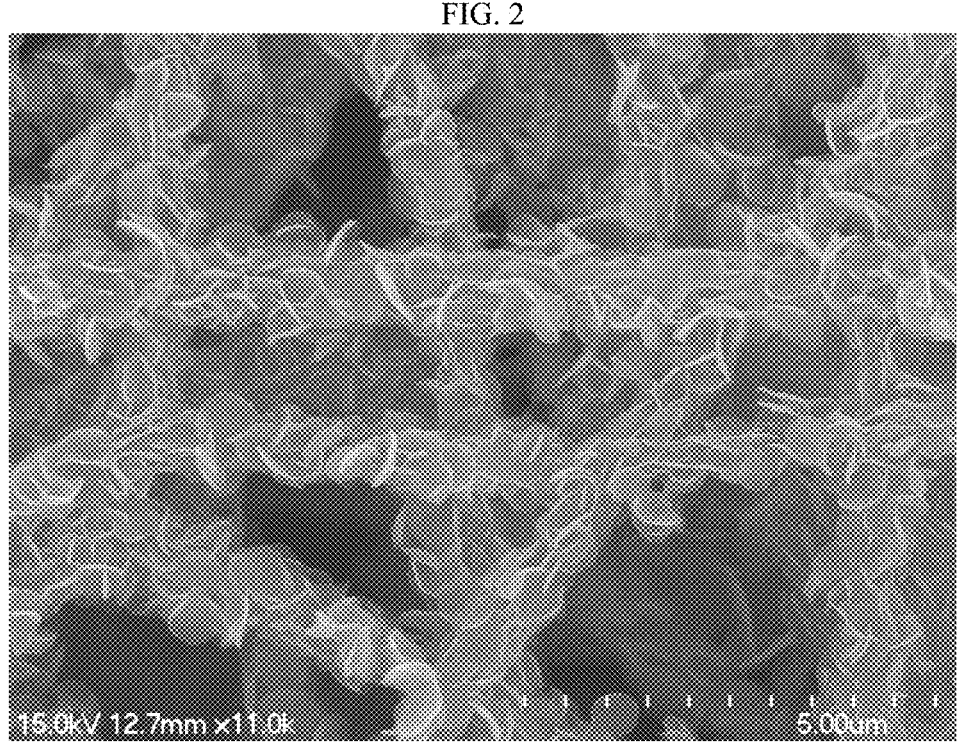
FIG. 2 is the SEM image of carbon nanofibers modified by iodine-doped $Bi_2O_2CO_3$ nanosheets.

Preparation of carbon nanofibers modified by iodine-doped $Bi_2O_2CO_3$ nanosheets. Specific steps are as follows:

0.8 g of bismuth citrate and 0.23 g of sodium carbonate are added to a mixed solution of 30 ml of water and 6 ml of ethylene glycol, sonicated for 5 minutes, stirred for half an hour, and further added 0.6 g of sodium iodide and stirred at room temperature for 2 hours hour. Then, the mixed precursor is transferred to a 50 mL Teflon-lined stainless reaction vessel together with 50 mg of carbon nanofibers. The reaction is carried out for 30 hours at 160° C. After the reaction is completed, the product is naturally cooled to room temperature and the product is taken out with tweezers. Washed with water and ethanol twice, respectively, and dried in vacuo; FIG. 2 the SEM image of carbon nanofibers modified by iodine-doped $Bi_2O_2CO_3$ nanosheets, the iodine-doped $Bi_2O_2CO_3$ nanosheets are coated on the surface of carbon nanofibers evenly.

Figure 3:
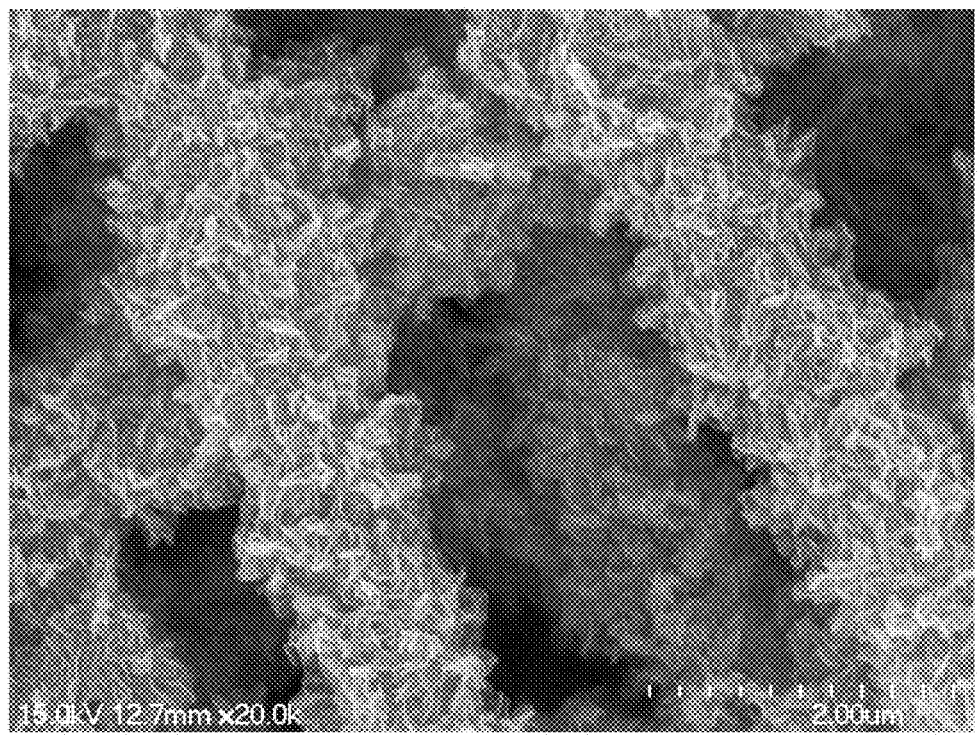
FIG. 3 is the SEM image of carbon nanofibers modified by iodine-doped $Bi_2O_2CO_3$ nanosheets and $MoS_2$ nanoflakes.
Figure 4:
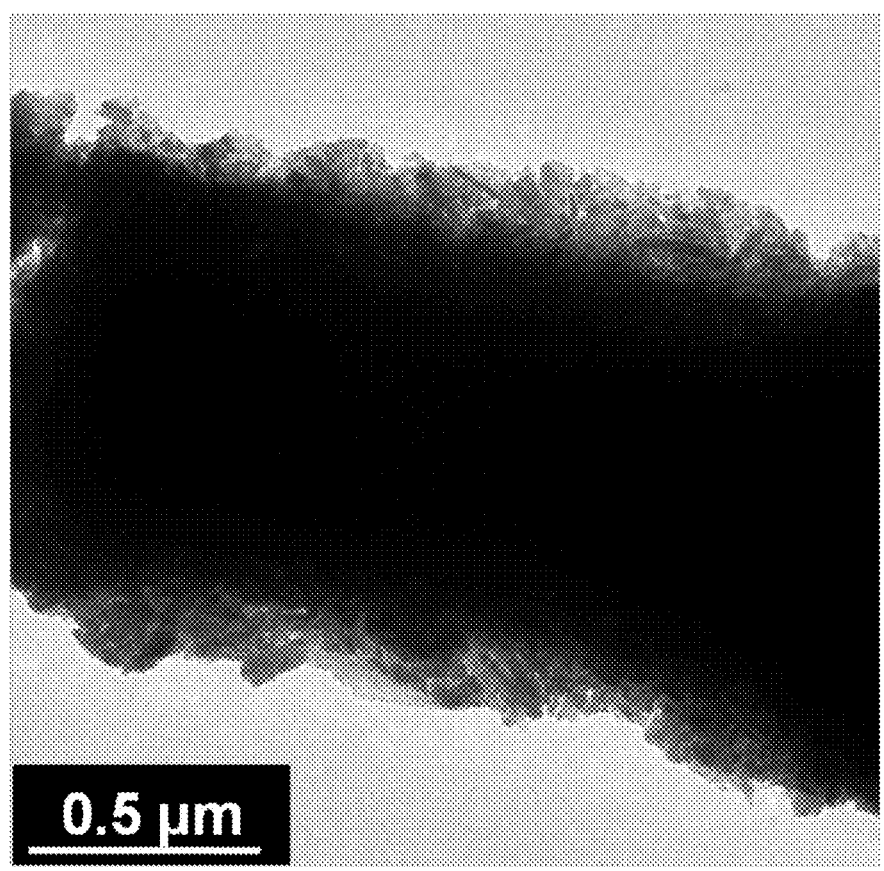
FIG. 4 is the TEM image of carbon nanofibers modified by iodine-doped $Bi_2O_2CO_3$ nanosheets and $MoS_2$ nanoflakes.

Preparation of carbon nanofibers modified by iodine-doped $Bi_2O_2CO_3$ nanosheets and $MoS_2$ nanoflakes. Specific steps are as follows:

24 mg of sodium molybdate and 20 mg of thioacetamide are dispersed in 30 ml of water, sonicated for half an hour and stirred at room temperature for half an hour, then the precursor is transferred to a 50 mL Teflon-lined stainless reaction vessel together with 50 mg of carbon nanofibers modified by iodine-doped $Bi_2O_2CO_3$ nanosheets to carry out the second reaction at 200° C. for 7 hours. After the reaction is over, the mixture is naturally cooled to room temperature, and the product is removed by tweezers and washed twice with water and ethanol, respectively, and dried in vacuo. FIG. 3 and FIG. 4 showed the SEM and TEM images of carbon nanofibers modified by iodine-doped $Bi_2O_2CO_3$ nanosheets and $MoS_2$ nanoflakes, the structure of which can be seen that $MoS_2$ nanoflakes modified to its surface uniformly.

Example 2

Figure 5:
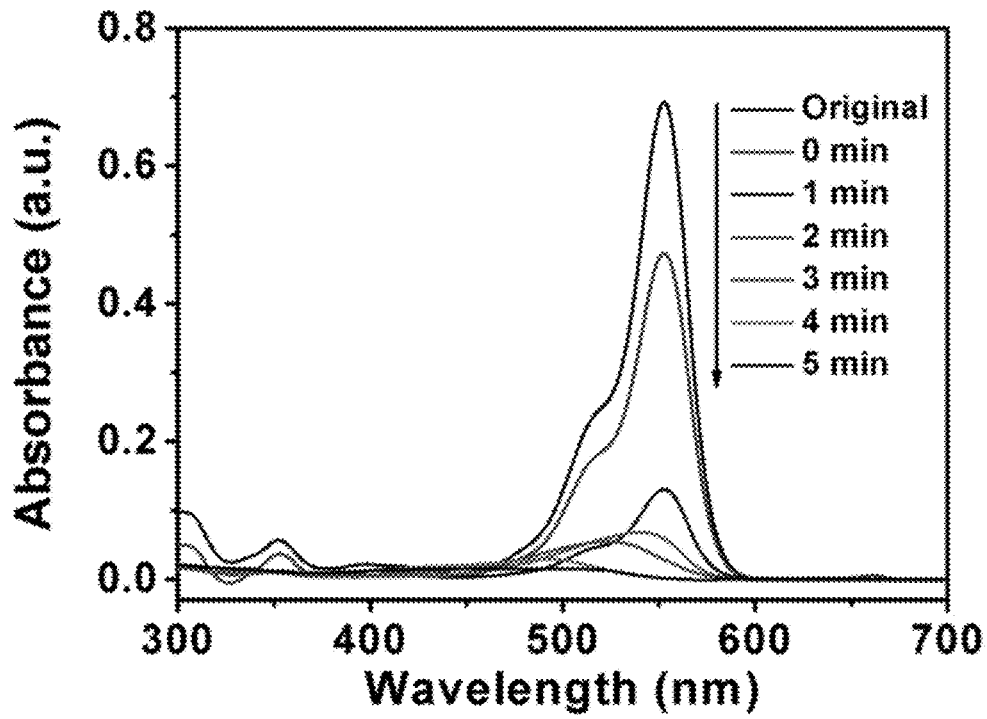
FIG. 5 is the UV-vis DRS spectra of RhB solution photodegraded by carbon nanofibers modified by iodine-doped $Bi_2O_2CO_3$ nanosheets and $MoS_2$ nanoflakes.
Figure 6:
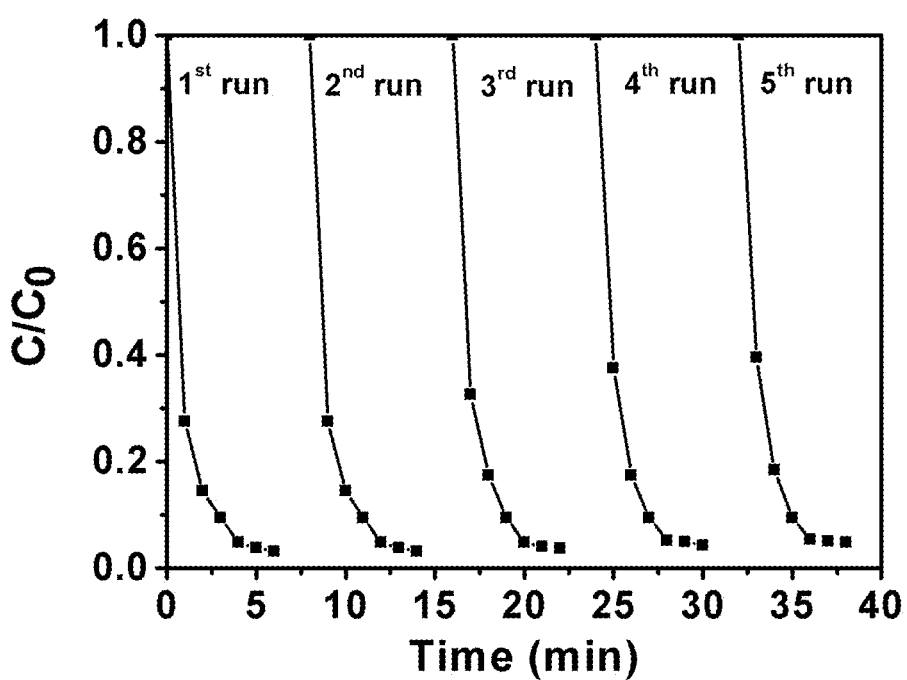
FIG. 6 is cycling effect of the composites.
Figure 7:
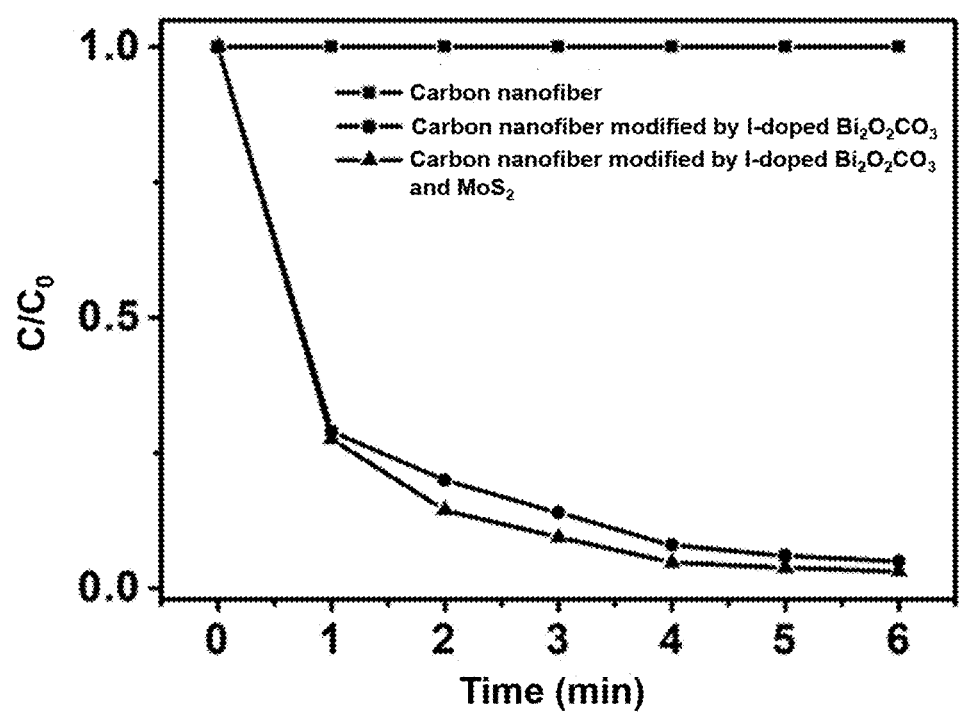
FIG. 7 is comparison chart of the effect of photocatalytic degradation of Rhodamine B by several composites.

Photocatalytic degradation of Rhodamine B. Specific steps are as follows:

50 mg of a carbon nanofiber membranes modified by iodine-doped $Bi_2O_2CO_3$ nanosheets and $MoS_2$ nanoflakes are added to a beaker containing a 50 ml (5 ppm) Rhodamine B solution, kept in a water bath at 25° C., stirred for 30 minutes in the dark, the photocatalyst composite and dye reached adsorption equilibrium, and then open the 300 W xenon lamp irradiation sampling every one minute for UV detection, the Rhodamine B solution could be degraded completely within 5 min. Photocatalyst composite material can be recycled many times, with good stability, the catalytic effect is still good the catalytic effect is still good recycling after 5 times; FIG. 5 is the UV-vis DRS spectra of RhB solution photodegraded by carbon nanofibers modified by iodine-doped $Bi_2O_2CO_3$ nanosheets and $MoS_2$ nanoflakes;

FIG. 6 is cycling of carbon nanofibers modified by iodine-doped $Bi_2O_2CO_3$ nanosheets and $MoS_2$ nanoflakes photocatalyst for RhB degradation; FIG. 7 is comparison chart of the effect of photocatalytic degradation of Rhodamine B by several composites.

The above analysis shows that the carbon nanofibers modified by iodine-doped $Bi_2O_2CO_3$ nanosheets and $MoS_2$ nanoflakes synthesized by the two-step hydrothermal reaction have good photocatalytic activity on the dye Rhodamine B; and can be recycled for many times and has the advantages that the preparation process is relatively simple, and the raw materials are easy to obtained, etc., has a prospect in the application of wastewater treatment.

What is claimed is:

1. A preparation method of iodine doped bismuthyl carbonate nanosheet and molybdenum disulfide modified carbon nanofiber composites, characterized in comprising the following steps:
   (1) dispersing nano carbon fiber membrane, bismuth citrate, sodium iodide and sodium carbonate in a mixed solution of water and ethylene glycol to obtain a kind of nano carbon fiber material modified by iodine doped bismuthyl carbonate;
   (2) dispersing sodium molybdate and thioacetamide in water, then adding said nano carbon fiber material modified by iodine doped bismuthyl carbonate, reacting to obtain iodine doped bismuthyl carbonate nanosheet and molybdenum disulfide modified carbon nanofiber composites.

2. The preparation method of iodine doped bismuthyl carbonate nanosheet and molybdenum disulfide modified carbon nanofiber composites according to claim 1, wherein in step (1), using an N.N-dimethylformamide solution of polyacrylonitrile as raw material, obtaining polyacrylonitrile fiber membrane by electrospinning method, then calcining to obtain nano carbon fiber membrane; the diameter of said nano carbon fiber membrane is 0.5 μm.

3. The preparation method of iodine doped bismuthyl carbonate nanosheet and molybdenum disulfide modified carbon nanofiber composites according to claim 2, wherein in step (1), the calcination conditions are calcination for 3 to 6 hours under argon, the calcination temperature is 400 to 600° C., the heating rate is 2 to 15° C. per minute.

4. The preparation method of iodine doped bismuthyl carbonate nanosheet and molybdenum disulfide modified carbon nanofiber composites according to claim 1, wherein in step (1), the mass ratio of said bismuth citrate, sodium carbonate, sodium iodide and said nanocarbon fiber membrane is (132 to 134):(38 to 40):100:(8 to 10), after dispersing nano carbon fiber membrane, bismuth citrate, sodium iodide and sodium carbonate in a mixed solution of water and ethylene glycol, waiting 2 to 4 hours to start the reaction, the reaction temperature is 150 to 180° C., and reaction time is 24 to 36 hours.

5. The preparation method of iodine doped bismuthyl carbonate nanosheet and molybdenum disulfide modified carbon nanofiber composites according to claim 1, wherein in step (2), the mass ratio of said sodium molybdate and thioacetamide is 1.2:1, dispersing said sodium molybdate and thioacetamide in water, after ultrasonic treatment for half an hour, adding said nano carbon fiber material modified by iodine doped bismuthyl carbonate, the reaction temperature is 180 to 250° C., reaction time is 6 to 8 hours.

6. The preparation method of iodine doped bismuthyl carbonate nanosheet and molybdenum disulfide modified carbon nanofiber composites according to claim 1, wherein in step (1), after the reaction is finished, the product is washed with water and ethanol respectively, and then vacuum-dried to obtain nano carbon fiber material modified by iodine doped bismuthyl carbonate; in step (2), the product is washed with water and ethanol respectively, and then vacuum-dried to obtain iodine doped bismuthyl carbonate nanosheet and molybdenum disulfide modified carbon nanofiber composites.

7. A preparation method of nano carbon fiber material modified by iodine doped bismuthyl carbonate, characterized in comprising the following steps: dispersing nano carbon fiber membrane, bismuth citrate, sodium iodide and sodium carbonate in a mixed solution of water and ethylene glycol to obtain a kind of nano carbon fiber material modified by iodine doped bismuthyl carbonate.

8. The preparation method of nano carbon fiber material modified by iodine doped bismuthyl carbonate according to claim 7, wherein using an N.N-dimethylformamide solution of polyacrylonitrile as raw material, obtaining polyacrylonitrile fiber membrane by electrospinning method, then calcining to obtain nano carbon fiber membrane; the diameter of said nano carbon fiber membrane is 0.5 μm, the mass ratio of said bismuth citrate, sodium carbonate, sodium iodide and said nanocarbon fiber membrane is (132 to 134):(38 to 40):100:(8 to 10), after dispersing nano carbon fiber membrane, bismuth citrate, sodium iodide and sodium carbonate in a mixed solution of water and ethylene glycol, waiting 2 to 4 hours to start the reaction, the reaction temperature is 150 to 180° C., and reaction time is 24 to 36 hours.

\* \* \* \* \*